United States Patent Office 2,716,601
Patented Aug. 30, 1955

2,716,601

LOW TEMPERATURE REDUCTION OF IRON OXIDES IN THE PRESENCE OF HALIDE

Henry L. Crowley, South Orange, N. J., assignor, by mesne assignments, to Republic Steel Corporation, Cleveland, Ohio, a corporation of New Jersey No Drawing. Application May 8, 1950,
Serial No. 160,829

2 Claims. (Cl. 75—34)

The present invention relates to a process of producing powdered iron by the low temperature reduction of iron oxide containing materials. Such materials include relatively pure iron oxides, or concentrates including such oxide or oxides and many natural ores containing one or more of the oxides of iron. By means of the control, according to the present invention, it has been found possible to prepare non-pyrophoric, reduced iron powder in a relatively low temperature range in which normally, and for some materials, there would be produced a spontaneously ignitable or rapidly oxidizing powder when operating other than in accordance with the present invention.

It has been found possible, in accordance with the present invention, to enhance the magnetic quality of iron powders reduced from oxides by this method or process; and this is a further purpose of the present invention.

As such, the invention comprises treating a starting material which consists of, or includes, one or more of the oxides of iron to a substantial amount, that is, to an extent warranting the practice of the present process, and which may or may not include some other materials, including gangue and/or oxides or some other compounds of metals other than iron. This material is first comminuted to a size permitting adequate treatment and then brought into contact with a gaseous reducing agent, the essential active ingredient of which is hydrogen, in the presence of a hydrogen halide, the latter having a concentration less than that required to convert a substantial amount of the oxide of iron to iron halide. The temperature at which the reduction takes place is maintained between about 500° C. and about 600° C. for the purpose of the present invention, i. e., to produce a non-pyrophoric powder. The iron powder produced in accordance with this process is usable in powder metallurgy and in addition has certain desirable electrical properties, particularly when used to form magnetic cores which have high permeability.

In general it is believed that particle size is more or less a function of the temperature at which the reduction takes place, lower temperatures producing smaller particle size. At the same time it is known that lower temperatures, under many circumstances, increase the tendency for the iron powder so produced to be pyrophoric in character. This will be discussed more in detail hereinafter. The present invention provides a reduction process in the presence of a hydrogen halide, which permits the use of the desired lower temperatures required to give desired small particle size characteristics, while at the same time preventing the powder so produced from being pyrophoric in character.

It has been found that there is a maximum concentration ratio of a hydrogen halide, such, for example, as HCl, in respect to hydrogen, above which ratio the iron oxide will be converted to an undesired extent to ferrous chloride instead of to elemental iron. Below this ratio it is possible to produce iron powder, the halide present acting to prevent pyrophorism therein. This ratio varies with temperature as hereinafter more particularly set forth. The present invention, therefore, is directed to the treatment of iron oxide material with a reducing gas which includes some hydrogen halide in an amount below this ratio as aforesaid, considering, of course, the temperature at which the reduction is to take place. Following the reduction of the oxide material to a metallic iron powder, the powder must be cooled down to a temperature at which the reduced iron powder will not oxidize; and during the cooling the iron powder must be maintained in a non-oxidizing atmosphere. The product of this reaction is usually a friable type of sponge material which is easily broken up to form powder consisting of discrete particles, for example, in an air attrition mill. The present invention includes, therefore, the making of this type of friable sponge material, which, by reason of its characteristic of being easily broken up, may be considered and is hereinafter considered as a powder.

The obtaining of small discrete crystalline particles is advantageous in the subsequent fabrication of many mechanical parts by processes known to the art of powder metallurgy. These small discrete crystalline particles are particularly useful, however, in the fabrication of electrical parts, for instance electronic cores, shielding used in electronic equipment, and the like.

It has long been recognized that it is physically possible to remove oxygen from ferric oxide-containing materials or ores at temperatures as low as about 500° C., or even somewhat lower in certain instances, using hydrogen as a reductant, but the products of such reductions have remained unusable for reasons hereinafter set forth. Not only has it been found very difficult to remove all the oxygen combined with the iron, but also the resulting materials have exhibited enhanced rates of recombination with oxygen when exposed to the air, in many instances sufficiently so as to initiate pyrophorism. In other materials this characteristic has been evidenced by the propensity for extremely rapid "rusting." These characteristics are referred to herein as pyrophorism and the product, as pyrophoric iron.

Scientific investigations of the phenomena of pyrophorism so far have not furnished an unequivocal explanation for all examples of such behavior. Well authenticated factors that bear directly on the practical elements of the problem are:

1. The metal in pyrophoric products, or those subject to rapid rusting, is apparently in an abnormal energy state. Such energy may exert a "trigger" action in starting spontaneous oxidation.

2. Well reduced iron may sometimes be considered as "charged" with hydrogen, presumably in an atomic or nascent state, either dissolved or adsorbed. Such materials may show catalytic activity.

3. While in general pyrophorism appears to increase with decrease in apparent particle size and bulk density, submicron sized particles made by methods other than that of oxide reduction are stable, and seldom show pyrophorism.

4. The atomic "packing" density of the oxide lattice of the source material apparently influences the product; iron produced from magnetite or spinel-like lattices being denser and hence much less pyrophoric than those from hematites.

One theory which has been advanced tending to explain pyrophorism is based upon the fact that below certain temperatures, that vary somewhat with the source material, the free iron atoms produced by hydrogen reduction do not possess sufficient mobility to adjust themselves to stable, normal positions of the alpha-iron lattice. The time of reduction may also be a factor in pyrophorism; for example, a typical material showing pyrophorism when reduced in one given period of time may be non-pyrophoric when reduced in a time period substantially three times the duration of the first period and at about the same temperature. For practical purposes of reduction on a commercial basis, it is desirable to utilize short processing time periods. Such short periods may not be compatible with the development of a normally stable lattice structure at temperatures where low atom mobility prevails. It may be, therefore, that pyrophorism is a characteristic of the lattice structure and that the presence of a hydrogen halide, in accordance with the present invention, influences the mobility of the iron atoms or otherwise controls lattice structure, so as to produce substantially stable particles. As such, the present invention includes, as a principal feature, the discovery that in the presence of hydrogen halides, for example, HCl, maintained in the stream of gas containing hydrogen used to reduce iron oxide materials, pyrophorism, which may be explained as hereinabove set forth, is substantially prevented. The exact nature of the reaction taking place, which may be catalytic in character to some extent at least, is not fully understood. The theories hereinabove set forth are submitted as being the best presently available tending to explain the novel and useful results herein specifically taught.

One of the objects of the present invention is to provide a process as herein set forth wherein the solid material is agitated during the reduction of the iron oxide content thereof. This results in better gas-to-solid contact, which, in turn, results in a speeding-up of the reduction reaction. It is, therefore, preferred to agitate the charge during the reduction, so as to save this time which would otherwise have to be used in reducing a stationary charge. While agitation is desirable, as aforesaid, it is not necessary to the operativeness of the process, as a charge may be reduced in accordance with the present invention, without such agitation. It has been found that the lower the temperature, the less tendency there is for the material to "ball-up" or stick together or to the apparatus in which the process is carried on. Thus another advantage of operating in the lower temperature range contemplated in accordance with the present invention is the minimizing of the sticking tendency of the charge. This, in turn, permits the use of agitation, which might be prohibitive if the sticking or "balling-up" tendency of the charge were too great.

It is recognized that attempts have been made in the prior art to reduce iron oxide by directly subjecting such oxide to a reducing gas at relatively high temperatures in respect to those contemplated for use in accordance with the present invention. When such high temperatures have been used, there has been at least incipient sintering, which is usually undesirable when the object is to make a powdered product useful, for example, in powder metallurgy. Attempts have also been made in the prior art to use relatively low temperatures. In all such cases, there is produced pyrophoric iron, rather than non-pyrophoric iron, the latter being at least desirable and usually essential for powder metallurgy and analogous purposes. Pyrophoric iron is useless for most subsequent treatments or for fabrication, as it is often dangerous, and under certain conditions tends even to become explosive.

Another feature of the present invention is in the separation of iron from ores which contain more or less gangue, including silica. By treating such an ore by the process of the present invention to reduce the iron at low temperature, it is possible to secure non-pyrophoric reduced iron which is magnetic in character, while at the same time preventing the sintering of the iron which might cause difficulty in the separation thereof from the gangue. When this reduced material is then comminuted by any suitable crushing and/or grinding operation, the reduced iron may be easily separated by suitable magnetic separation. This reduced iron may be used for any purposes for which it is suitable.

In accordance with the present invention, the starting material, containing a substantial amount of one or more of the oxides of iron, is supplied to a reducing chamber or reducing apparatus, prior to which it is suitably comminuted to a desired particle size, which may, for example, be from about 8 mesh to about 100 mesh or finer. In general, if the material prior to the reduction is ground to a small particle size, for example 200 mesh to 300 mesh, the final product will have a correspondingly small particle size. Such small particle size in the reduced material makes for easier and more complete separation of the reduced iron from the gangue.

The starting material so introduced into the reducing chamber may be any ore material as aforesaid, including not only one or more of the oxides of iron, but also gangue or chemically inert materials, compounds including the various oxides or other naturally occurring compounds of other metals, such as compounds of manganese, nickel, cobalt, etc., concentrates produced by commercial or other methods from such ores, and also some chemically pure oxide or oxides of iron. There is a practical limitation upon the types of ores, which can be used in accordance with this process, which is imposed by economic rather than by chemical considerations, namely, if the ore or starting material contains lime ($CaCO_3$) or magnesium including $MgCO_3$ in substantial amounts, then such carbonate material may have such a high affinity for hydrogen halides as to defeat the purpose of the process from an economic point of view. It is, of course, possible, even with materials of this kind, to obtain the desired results by supplying sufficient hydrogen halide, so as to neutralize such alkaline earth carbonate compounds as aforesaid and as may be present and have sufficient hydrogen halide remaining over to carry out the purpose of the present invention. The use of such a large quantity of hydrogen halide is usually undesirable from an economic point of view.

The process of the present invention may be carried out either intermittently as a batch or continuously and may be performed using known types of gas-to-solid contact apparatus. Any apparatus either well-known or specifically designed for the particular process forming the basis of this application may be used, the apparatus per se forming no part of the present invention and hence not being illustrated or particularly described in this case.

The gaseous mixture used in effecting the reduction in accordance with the present invention, has as its essential reducing agent, hydrogen. There is also present, in accordance with the present invention, a predetermined concentration of a hydrogen halide. There may further be present in the gas some diluent gas such as nitrogen, methane, carbon monoxide or carbon dioxide. It has been found that low temperature reduction of iron ores by carbon-containing gases often leads to soot formation. In some instances a small amount of such soot may not be undesirable in the final product. Under these circumstances, a small percentage of one or more carbon-containing gases may not be objectionable.

While it is contemplated, in accordance with the present invention, that the presence of hydrogen halide is essential, it has been found in practice that this essential element of the gas may be introduced in several ways. For example, the gas may have admixed therewith a hydrogen halide, such as HCl, as these gases are introduced into the reducing chamber. Alternatively, a halogen in elemental form may be introduced into the chamber or into the hot gas stream and will react therein with the hydrogen which is present as aforesaid to form the hydrogen halide. As a further alternative, a normally solid halide of iron, such as $FeCl_2$ or $FeCl_3$, may be admixed with the solid materials entering the reducing chamber; or this solid iron halide may be otherwise placed in the gas stream at some place past which the gas is caused to flow in an apparatus for carrying on the process. If then the temperature of the iron halide is maintained sufficiently high, i. e. in the temperature range at which reduction is to be carried on in accordance with the present invention (that is about 500° C. to about 600° C.), then there will be a reaction between the hydrogen of the gases and the iron halide progressively to form the necessary hydrogen halide in accordance with the present invention.

In this connection, however, it has been found that in order that the resulting product (iron powder) be non-pyrophoric in character, the hydrogen halide must be present in the gas stream throughout substantially the entire reducing operation. Thus, if the hydrogen halide be introduced as a gas along with the gaseous reductant, such introduction of the halide must be substantially continuous throughout the reducing operation and until there are substantially no iron oxides left in the solid material present. The same principle applies to the introduction of elemental halogen into the gas stream for generating the hydrogen halide in situ therein. If, on the other hand, the hydrogen halide be introduced by the method of introducing a solid halide of iron, for example into the solid materials introduced into the reducing chamber, then sufficient of such iron halide must be present initially, so that the generation of the hydrogen halide and the presence thereof will be substantially continuous during substantially all the time that iron oxide is being reduced to iron. In all cases, of course, the hydrogen halide must be available in the gaseous mixture, so as to be in contact with the iron oxide or oxides during the reducing operation itself, i. e. while the hydrogen is reacting with the oxide of iron to form elemental iron.

The reduction step of the process, according to the present invention, is carried on in the temperature range of about 500° C. to about 600° C. Preferably, however, this reduction step is carried on within the narrower range of about 525° C. to about 550° C. The reasons for these limits are substantially as follows: At temperatures under about 500° C. the rate of reduction is so slow as to become economically prohibitive. This is believed to be partly due to the temperature effect alone upon the reaction rate and partly because the hydrogen halide concentration must be kept to a very low level to avoid the formation of a substantial amount of iron chloride.

While it is possible and operative to produce iron powder at temperatures above 550° C., but below 600° C., the characteristics of the final product are such as to make it undesirable for certain electrical purposes, such as electronic cores. At temperatures above about 600° C. the problem of pyrophorism diminishes almost to the vanishing point, so that it is no longer necessary to have a hydrogen halide present in order to prevent the iron produced from being pyrophoric. The present invention, therefore, does not seek to cover the preparation of iron powders at such high temperatures. Furthermore at these higher temperatures, i. e. above about 600° C., the iron powder produced tends to be coalesced or sintered, the degree of such sintering being progressively greater as the temperature rises. The present invention, furthermore, does not include production of such wholly or partially sintered iron particles, it being a particular objective of the present invention to produce substantially pure iron particles which are not agglomerated or sintered to any substantial extent, but which are small, discrete, crystalline particles of substantially uniform size and density.

The following examples illustrate the operation of the process as hereinabove described:

*Example 1.*—Synthetic ferric oxide, substantially pure, was spread one to two inches deep upon trays in a hydrogen-tight stationary retort furnace. After heating this material to 550° C., the atmosphere of said furnace having previously been purged of oxygen-contained gas, hydrogen containing 2 to 3% HCl was supplied to the furnace at a rate such that a stoichiometric amount of the hydrogen would pass through the furnace within a four hour period. At the expiration of this time, the HCl feed was stopped and pure oxygen-free hydrogen was passed through the furnace at the same rate for another time period of about one-half hour to one hour. This was for the purpose of sweeping out any remaining HCl and reducing to the elemental form any iron in the form of iron chloride remaining at the end of the principal reducing period. The furnace was then sealed against influx of air and cooled to a temperature such that the iron as removed would not immediately recombine with oxygen, i. e. below about 150° F. The product so made was found to be non-pyrophoric and to have magnetic properties superior to iron produced from the same oxide by simple hydrogen reduction at a substantially higher temperature. This indicated that the physical characteristics were superior from this electrical point of view.

*Example 2.*—20 grams of C. P. $Fe_2O_3$ was reduced in a rotary furnace at 400° C. through which a gas consisting of hydrogen, to which ⅛% HCl was added, was passed for a period of about four hours, the rate being about 37 cc./sec. of dry pure hydrogen. At the end of this period the sample was cooled to about 150° F. in a non-oxidizing atmosphere. The sample was pyrophoric.

This illustrates that at this temperature the HCl present was not adequate to prevent pyrophorism.

*Example 3.*—About 30 pounds of $Fe_3O_4$ to which 0.1% $FeCl_2$ was added was reduced on a batch basis in a reduction furnace. The furnace was heated as in Example 2 and was maintained at a temperature in the order of magnitude of 450° C. to 500° C. and hydrogen was passed through the furnace for 10 hours at the rate of 60 to 80 cu. ft. of hydrogen per hour. Thereafter the sample was cooled in a non-oxidizing atmosphere to a temperature of about 150° F. It was found that the reduction was incomplete, in that only a very small proportion of the iron oxide was reduced to metallic iron. It may be concluded, therefore, that in this temperature range, the rate of reduction is so slow as to be economically impractical.

*Example 4.*—Twenty grams of C. P. $Fe_2O_3$ was reduced as in Example 2 at a temperature of about 500° C. 23 cc./sec. of hydrogen, including 0.5% HCl was passed over the sample for a total period of two hours. Following the cooling of the sample as in Example 2, it was analyzed and found to contain 98.98% metallic iron and .30% $FeCl_2$. The product was non-pyrophoric and was considered satisfactory in accordance with the present invention.

*Example 5.*—A reduction was carried on as in Example 4, but with the temperature at 600° C. instead of 500° C. The total time was one hour and the gas was passed through the reducing apparatus at the rate of 18 cc./sec., this gas containing 1.75% HCl mixed with pure hydrogen. Following the cooling of the product as aforesaid, it was analyzed and found to contain 98.55% Fe and no detectable amount of $FeCl_2$. The product was non-pyrophoric. The shortening of the time in Example 5 over Example 4 was attributed to the higher temperature used in Example 5.

A series of tests was run to determine the effect of the addition of HCl in different amounts in the reducing gas. The results of these tests are given in the following examples.

*Example 6.*—A test was made as a control using no HCl at all. $Fe_2O_3$ (C. P.) was reduced for a period of two hours with hydrogen at 1100° F. The product was cooled in a non-oxidizing atmosphere and was found to be pyrophoric.

*Example 7.*—In each of a series of tests, 20 grams of C. P. $Fe_2O_3$ was reduced, in each case at 500° C., and in each case for a period of two hours, all conditions being maintained the same with the exception of the per cent of HCl mixed with pure hydrogen in the reducing gas. In the first of these tests ⅛% HCl was used. Following the cooling as aforesaid the final product was analyzed and found to contain 98.58% Fe and 0.78% FeCl₂. In the second of these tests ¼% HCl was used; the final product containing upon analysis, 99.12% Fe and 0.78% FeCl₂. In the third of these tests, the concentration of HCl in the gas was ½% and the product contained upon analysis, 98.98% Fe and 0.30% FeCl₂. In a fourth test 1.5% HCl was used in the gas; and the final product contained upon analysis, 96.57% Fe and 3.12% FeCl₂.

From the above it was concluded that some HCl, for example, at least about ⅛% in the gas, is necessary for the attainment of the desired results, namely, non-pyrophoric iron as a product. It was further concluded that with different percentages of HCl up to ½%, the percentage of iron converted to and found in the final product as FeCl₂ was not undesirably high, i. e. less than 1%. When, however, the HCl concentration in the gas was raised to more than a desired minimum, a substantial amount of the iron was chloridized, so that with 1.5% HCl the final product contained over 3% FeCl₂. At this temperature, therefore, the permissible percentage of HCl in the gas should be less than 1.5%. It was also found that if the final product were reduced with hydrogen without HCl therein following the reduction with HCl present, then any FeCl₂ present could be reduced to metallic iron.

The following two examples show the applicability of the process to a concentrate made from a natural ore as distinguished from some pure oxide of iron and also the applicability of the process to a natural ore itself.

*Example 8.*—A concentrate of a natural ore having the following analysis was used.

| | Percent |
|---|---|
| Fe₃O₄ | 92.8 |
| Mn | 0.038 |
| P | 0.012 |
| SiO₂ | 5.51 |
| MgO | 0.22 |

This material was ground to less than 8 mesh and was reduced at 500° C. in a gaseous mixture containing 0.5% HCl in hydrogen for a period of approximately two hours and the product thereafter cooled in a non-oxiding atmosphere. In this period it was found that the material had been incompletely reduced. This result coordinated with other results obtained in working with this particular type ore, which is high in magnetite as shown by the analysis above. In general, such ore material takes longer to reduce than Fe₂O₃. However, during this period, the reduction proceeded in a desired manner, in that an analysis of the final product showed no detectable FeCl₂ and showed that the metallic iron formed, of which there was 46.35%, was non-pyrophoric in character.

*Example 9.*—A Tobin ore was used in this example, having the following analysis

| | Percent |
|---|---|
| Ignition loss (moisture) | 1.53 |
| FeO | 1.88 |
| Fe₂O₃ | 64.7 |
| Mn | 0.139 |
| P | 0.594 |
| S | nil |

The reduction conditions were maintained as in Example 8 for a similar period of time. As before, the reduction was incomplete; but the product contained no appreciable amount of FeCl₂ and the metallic iron produced, which was found on analysis to be 41.40% was non-pyrophoric.

From Examples 8 and 9, it is concluded that while a longer period of time is required than was actually provided in the tests disclosed for complete reduction, the desired results as to non-pyrophorism were obtained. The process of the present invention is thus shown to be operative when applied to concentrates and also to natural ores.

Examples follow illustrating the use of the process of this invention wherein the halide is introduced in solid form.

*Example 10.*—"Mapico black," which is a commercially refined oxide of iron consisting of 99+% Fe₃O₄ and in the form of a fine powder (0.6 to 0.1 micron particle size) was thoroughly mixed with 4% by weight of FeCl₂·4H₂O. This mixture was placed in a rectangular wire basket 2″ x 3″ in horizontal cross-section and to a depth of about 1″. Four such baskets were used with a half-pound of mixture to each basket. These baskets were placed in a steel cylinder about 5″ in diameter and were suitably separated from one another so as to permit gas flow therebetween. The ends of the steel cylinder were suitably closed and provision was made for passing gas into and out of the cylinder. The cylinder was placed in a Globar furnace and preheated for about one hour to bring it up to the desired temperature, which was about 525° C. The temperature of this cylinder was maintained in the range of 525° C. to 550° C. throughout the operation. After the preheating, hydrogen was passed into the cylinder and exhaust gases therefrom passed out through a separate tube. The reducing operation, including the flow of hydrogen, was carried on for a period of about six hours. During this period 110 cu. ft. of hydrogen was passed through the apparatus, this volume being measured at room temperature and pressure conditions. The charge was then cooled using a relatively small flow of hydrogen through the cylinder during the cooling operation, which took place in about an hour. This powder was non-pyrophoric and upon chemical analysis was found to contain the following: iron 98.08%; loss of weight in hydrogen 1.32%; carbon 0.04%; sulfur 0.023%; manganese 0.05%; acid insolubles 0.37%. This powder was ground in an attrition mill to break up particles which were slightly sintered together. This material was then tested for its electrical properties which were found to be satisfactory for high frequency electronic applications. The particle size was found to be extremely small of the order of about one micron or less.

*Example 11.*—The test as set forth in Example 10 was repeated, using substantially pure ferric oxide (Fe₂O₃) in lieu of the Fe₃O₄ used in Example 10. Other conditions remained substantially the same throughout. The resulting iron powder has similar size and electrical characteristics and was non-pyrophoric in character.

*Example 12.*—Susquehanna hematite (a natural ore) was reduced in accordance with the present invention. This ore had an initial analysis as follows:

| | Percent |
|---|---|
| Fe | 57.45 |
| P | .035 |
| SiO₂ | 10.68 |
| Al₂O₃ | .96 |
| Mn | .53 |
| Ignition loss (moisture) | 14 |

This ore was reduced at a temperature of about 600° C. using hydrogen gas. In order to supply halide to the reduction reaction, FeCl₂·4H₂O was admixed with the ore. It was found that 15% FeCl₂·4H₂O was insufficient to maintain an HCl concentration in the gas throughout the reaction, so as to prevent the product being pyrophoric.

The same reaction was carried out using 20% admixed FeCl₂·4H₂O with the result that the reduced iron which was produced was non-pyrophoric in character. A factor which is believed to be explanatory of the reason for the relatively large amount of ferrous chloride used in this case is that the particles of the ore used in this case were relatively large or coarse as compared to the particle size of the C. P. iron oxide used in other experiments (see Examples 10 and 11 above); and that the larger particles tend to reduce slower. Thus in order that an HCl concentration be maintained throughout the reduction operation, a larger amount of ferrous chloride must be present initially.

*Example 13.*—As illustrative of the fact that the halide may be added in the form of ferric chloride as compared with ferrous chloride used in previous examples, a sample of C. P. $Fe_2O_3$ was reduced at about 600° C. the sample containing 4% $FeCl_3.6H_2O$. A non-pyrophoric product was produced. As contrasted with this when only 3% $FeCl_3.6H_2O$ was used, the resulting product was pyrophoric, indicating that the necessary concentration of HCl in the gas in contact with the oxide had not been maintained throughout the period that the oxide was present and being reduced in the latter example; but when sufficient ferric chloride was present, the concentration of the hydrogen halide in the gas was maintained throughout and produced non-pyrophoric iron.

The fact that other halides than chloride are effective to give similar results is shown by the following examples:

*Example 14.*—A sample of ferric oxide was mixed with 10% $FeI_2$ and reduced at about 600° C. as in Example 11. The resulting product was non-pyrophoric.

*Example 15.*—The same test as in Example 14 was carried on by using 10% $FeBr_2$ as in Example 11. A non-pyrophoric product resulted.

The present application is restricted to the hydrogen halides shown to be operative in the foregoing examples, namely the compounds of hydrogen with chlorine, bromine and iodine; or in other words, the hydrogen halides of which the halogen has an atomic weight greater than that of fluorine.

In some circumstances the initial concentration of hydrogen halide in the gas may be effective to convert a part of the iron oxide of the charge into iron chloride. When operating in accordance with the present invention, however, the reducing action of the gas is always present.

Thus before the reduction reaction is completed under ordinary operations, any iron chloride produced as just stated, will be reduced to metallic iron, the hydrogen halide being regenerated by this action; and the overall result will be the production of metallic iron as aforesaid. This production of iron chloride may therefore be disregarded from the broad or overall point of view of the present invention as merely a possible explanation of the mechanism of the reaction, rather than a reaction which will take place as affecting the final product.

What is claimed is:

1. The process of making non-pyrophoric iron in discrete particles, which comprises subjecting an iron oxide containing material to the action of a gaseous reducing agent containing hydrogen at a temperature within the range of 500 to 600° C. and in the presence of a hydrogen halide other than the fluoride in amount less than theoretically required to convert a substantial amount of the iron oxide to the corresponding iron halide, then subjecting the resulting material to the action of a gaseous reducing agent containing hydrogen but in the absence of any hydrogen halide at a temperature within the range of 500 to 600° C., and thereafter cooling the reduced material in a non-oxidizing atmosphere and thereby producing a non-pyrophoric iron powder.

2. The process of claim 1 further characterized in that the proportion of hydrogen halide in the gaseous reducing agent is from 0.5 to 3% by volume with respect to the volume of hydrogen in the agent.

References Cited in the file of this patent

UNITED STATES PATENTS

| | | |
|---|---|---|
| 2,080,028 | Avery | May 11, 1937 |
| 2,384,971 | Silvasy et al. | Sept. 18, 1945 |

FOREIGN PATENTS

| | | |
|---|---|---|
| 740,913 | Germany | Nov. 1, 1943 |
| 592,404 | Great Britain | Sept. 17, 1947 |